(12) United States Patent
Hamada et al.

(10) Patent No.: US 12,157,458 B2
(45) Date of Patent: Dec. 3, 2024

(54) VEHICLE CONTROL SYSTEM STABILIZING BEHAVIOR OF A VEHICLE MOVING TO A ROAD EDGE TO BE STOPPED

(71) Applicant: Mazda Motor Corporation, Hiroshima (JP)

(72) Inventors: Takashi Hamada, Aki-gun (JP); Yuma Nishijo, Aki-gun (JP); Kouichi Kojima, Aki-gun (JP); Yoshiyuki Yamashita, Aki-gun (JP); Yuta Tsuji, Aki-gun (JP); Hiroshi Ohmura, Aki-gun (JP); Takashi Goto, Aki-gun (JP); Shoji Harada, Aki-gun (JP); Kenta Tada, Aki-gun (JP); Kazuki Sato, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 371 days.

(21) Appl. No.: 17/521,897

(22) Filed: Nov. 9, 2021

(65) Prior Publication Data

US 2022/0153260 A1    May 19, 2022

(30) Foreign Application Priority Data

Nov. 16, 2020    (JP) ................. 2020-190107

(51) Int. Cl.
*B60W 30/06*    (2006.01)
*B60W 10/18*    (2012.01)
(Continued)

(52) U.S. Cl.
CPC ............ *B60W 30/06* (2013.01); *B60W 10/18* (2013.01); *B60W 10/20* (2013.01);
(Continued)

(58) Field of Classification Search
CPC ............................. B60W 30/06; G06V 20/588
See application file for complete search history.

(56) References Cited

U.S. PATENT DOCUMENTS

| | | | | |
|---|---|---|---|---|
| 2011/0022317 A1* | 1/2011 | Okita | ...................... | G08G 1/161 701/301 |
| 2013/0311043 A1* | 11/2013 | Kobana | ................ | B62D 15/025 701/41 |

(Continued)

FOREIGN PATENT DOCUMENTS

JP    2009-163434 A    7/2009

*Primary Examiner* — Jess Whittington
(74) *Attorney, Agent, or Firm* — XSENSUS LLP

(57) ABSTRACT

A controller detects partitioning lines OL and BL of a road and a road edge E based on an image taken by a camera, generates a pair of left and right virtual lines $IL_L$ and $IL_R$ that extend from the side to the front of a vehicle along the partitioning lines OL and BL, controls the steering so the vehicle travels between the left and right virtual lines $IL_L$ and $IL_R$, moves the left virtual line $IL_L$ to a position in proximity to the road edge E and fixes the left virtual line $IL_L$ to this position, and then, moves the right virtual line $IL_R$ to a position separated from the left virtual line $IL_L$ by the width of the vehicle and fixes the right virtual line $IL_R$ to this position, and controls brakes to stop the vehicle after fixing the left and right virtual lines $IL_L$ and $IL_R$.

18 Claims, 8 Drawing Sheets

(51) Int. Cl.
  *B60W 10/20*      (2006.01)
  *G01C 21/36*      (2006.01)
  *G06V 20/56*      (2022.01)

(52) U.S. Cl.
  CPC ....... *G01C 21/3632* (2013.01); *G06V 20/588* (2022.01); *B60W 2420/403* (2013.01); *B60W 2552/53* (2020.02); *B60W 2710/18* (2013.01); *B60W 2710/20* (2013.01)

(56) References Cited

U.S. PATENT DOCUMENTS

| | | | | |
|---|---|---|---|---|
| 2014/0111369 A1* | 4/2014 | Oh | ................... | G06V 20/588 |
| | | | | 342/52 |
| 2019/0359209 A1* | 11/2019 | Mizutani | ......... | B60W 30/18163 |
| 2021/0229658 A1* | 7/2021 | Tsuji | ................ | B60W 60/0016 |
| 2022/0105931 A1* | 4/2022 | Motegi | ................. | G06V 20/56 |

\* cited by examiner

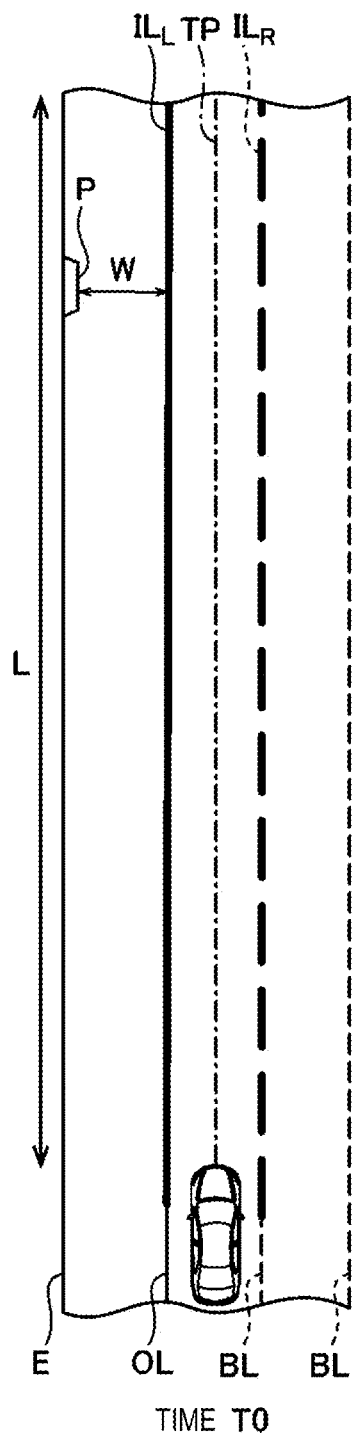
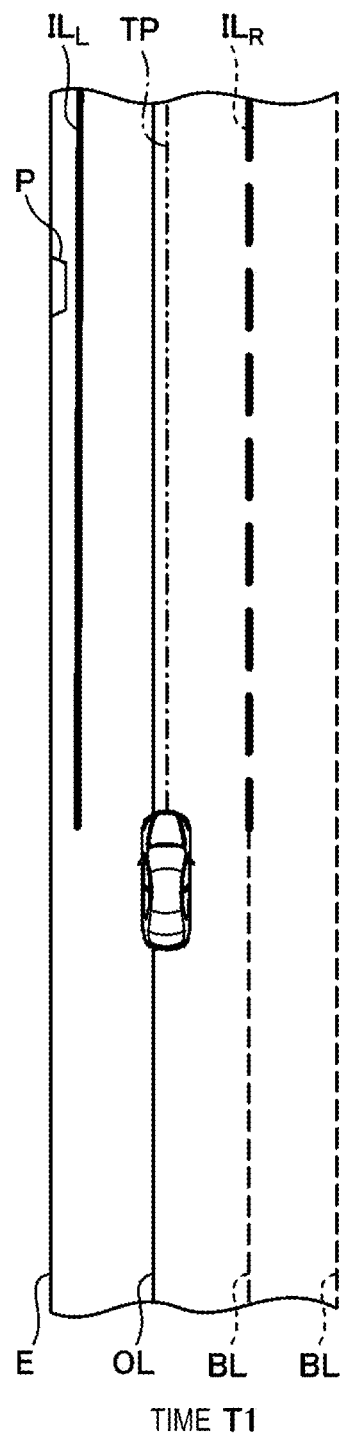
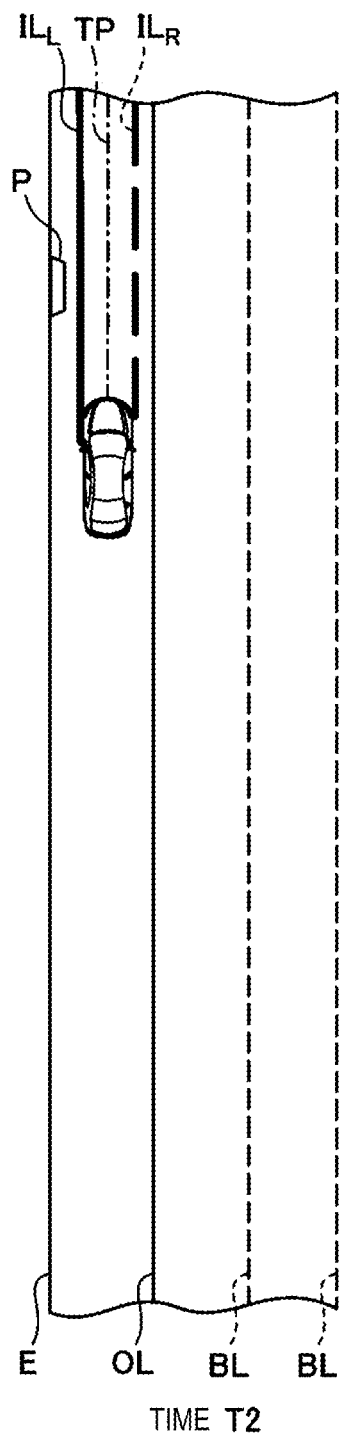

TIME T0

TIME T1'

TIME T2'

TIME T0

TIME T1"

TIME T2"

VEHICLE CONTROL SYSTEM STABILIZING BEHAVIOR OF A VEHICLE MOVING TO A ROAD EDGE TO BE STOPPED

CROSS-REFERENCE TO RELATED APPLICATION

The present application claims priority to Japanese application number 2020-190107 filed in the Japanese Patent Office on Nov. 16, 2020, the entire contents of which is incorporated herein by reference.

TECHNICAL FIELD

The present disclosure relates to a vehicle control system, and more particularly, to a vehicle control system that causes a vehicle to move to a road edge and stop.

BACKGROUND ART

A vehicle control system has been conventionally developed in which a vehicle is safely stopped when an abnormality of the driver is automatically detected or an occupant presses an emergency button if the driver falls into a state in which safety driving is not ensured. For example, patent document 1 discloses an emergency evacuation system that determines a target stop position such as an intersection or a road shoulder and stops own vehicle at the target stop position when the consciousness level of the driver is lowered.

PRIOR ART DOCUMENTS

Patent Documents

[Patent document 1] JP-A-2009-163434

SUMMARY

Problems to be Solved

The conventional technology such as the system in patent document 1 controls the steering angle so as to move the vehicle from the road edge by a predetermined distance based on the distance from the vehicle to the road edge detected by a millimeter wave sensor or the like. However, when a structure such as a guardrail, a wall, a utility pole, or a curb projects from the road edge toward the roadway, since the distance between the vehicle and the road edge detected by a millimeter wave sensor varies due to such a structure, the steering amount for moving the vehicle to the road edge also varies from moment to moment. As a result, the behavior of the vehicle until the vehicle is moved to the road edge becomes unstable, possibly increasing the anxiety and discomfort of the occupant.

The present disclosure addresses the problem described above, as well as other problems, with an object of providing a vehicle control system capable of stabilizing the behavior of the vehicle until the vehicle is moved to the road edge and stops.

Approaches for Solving the Problem

To achieve the object described above, as well as other objects, there is provided a vehicle control system that causes a vehicle to move to a road edge and stop, the vehicle control system including a camera that takes an image ahead of the vehicle; and a controller that controls a steering device and a braking device of the vehicle to cause the vehicle to move to the road edge and stop based on an analysis performed by the controller on the image ahead of the vehicle taken by the camera, in which the controller detects a partitioning line of a road and the road edge based on the image taken by the camera, generates a pair of left and right virtual lines extending from a side of the vehicle to the road in front of the vehicle along the partitioning line, controls the steering device so that the vehicle travels substantially in the middle of the pair of left and right virtual lines, moves a virtual line closer to the road edge of the pair of left and right virtual lines to a position in proximity to the road edge and fixes the virtual line closer to the road edge to the position in proximity to the road edge, and then moves a virtual line farther from the road edge of the pair of left and right virtual lines to a position separated from the virtual line closer to the road edge by a width of the vehicle and fixes the virtual line farther from the road edge to the position separated from the virtual line closer to the road edge, and controls the braking device so that the vehicle stops after fixing the pair of left and right virtual lines.

In the present disclosure, configured as described above, while controlling the steering device so that the vehicle travels in the middle of the pair of left and right virtual lines, the controller first fixes the virtual line closer to the road edge to the position in proximity to the road edge and then moves the virtual line farther from the road edge toward the road edge. With this, even when a structure such as a guardrail, a wall, a utility pole, or a curb projects toward the roadway from the road edge, the vehicle can be gradually moved to the road edge without being disturbed by variations in the distance between the road edge and the vehicle, thereby preventing the behavior of the vehicle from becoming unstable. Accordingly, when the driver falls in an incapacitated state, the behavior of the vehicle can be stabilized until the vehicle moves to the road edge and stops, thereby suppressing an increase in the anxiety and discomfort of the driver and other occupants.

In addition, in the present disclosure, the controller controls a movement speed of the virtual line closer to the road edge when the virtual line reaches the position in proximity to the road edge identical to a movement speed of the virtual line farther from the road edge when starting movement of the virtual line.

In the present disclosure configured as described above, when the virtual line closer to the road edge reaches the position in proximity to the road edge and the virtual line farther from the road edge starts moving, the movement speed in the vehicle width direction of the vehicle that travels in the middle of the pair of left and right virtual lines is smoothly continuous and does not change discontinuously. Accordingly, it is possible to prevent the occupant from suffering anxiety or discomfort due to an unstable behavior of the vehicle.

In addition, in the present disclosure, preferably, the controller gradually increases the movement speed of the virtual line closer to the road edge after starting movement of the virtual line closer to the road edge and gradually decreasing the movement speed of the virtual line farther from the road edge after starting movement of the virtual line farther from the road edge.

In the present disclosure configured as described above, the controller can gradually increase the movement speed in the vehicle width direction of the vehicle that travels in the middle of the pair of left and right virtual lines according to the movement of the virtual line closer to the road edge and then gradually decrease the movement speed according to the movement of the virtual line farther from the road edge. With this, the vehicle can be smoothly moved to the road edge.

In addition, in the present disclosure, preferably, the controller moves the virtual line closer to the road edge to a position in proximity to a position at which the road edge projects most toward a road and fixes the virtual line to the position.

In the present disclosure configured as described above, even when a structure such as a guardrail, a wall, a utility pole, or a curb projects toward the roadway from the road edge, the vehicle can be gradually moved to the road edge so as to correspond to the position at which the road edge projects most toward the road, thereby preventing the behavior of the vehicle from becoming unstable.

In addition, in the present disclosure, preferably, when the width of a road shoulder sandwiched between the road edge and the partitioning line closest to the road edge is less than the predetermined width, the controller makes the movement speed of the virtual line lower than when the width of the road shoulder is not less than the predetermined width.

In the present disclosure configured as described above, the movement speed in the vehicle width direction of the vehicle that travels in the middle of the pair of left and right virtual lines is lower than when the width of the road shoulder is not less than the predetermined width. That is, when the width of the road shoulder is narrow, the vehicle can be moved to the road edge for a longer period of time so as to prevent the occupant from suffering anxiety or discomfort.

In addition, in the present disclosure, preferably, when the width of the road shoulder sandwiched between the road edge and the partitioning line closest to the road edge is not less than the predetermined width and a length of the road shoulder is less than a predetermined length, the controller makes the movement speed of the virtual line higher than when the width of the road shoulder is not less than the predetermined width and the length of the road shoulder is not less than the predetermined length.

In the present disclosure configured as described above, the movement speed in the vehicle width direction of the vehicle that travels in the middle of the pair of left and right virtual lines is higher than when the width of the road shoulder is not less than the predetermined width and the length of the road shoulder is not less than the predetermined length. That is, the vehicle can be moved to the road edge in a shorter time and the vehicle can be moved to the road edge reliably within the length of the road shoulder that is less than the predetermined length.

Advantages

The vehicle control system according to the present disclosure can stabilize the behavior of the vehicle until the vehicle is moved to the road edge and stops.

BRIEF DESCRIPTION OF THE DRAWINGS

FIGS. 4A, 4B and 4C are a plan view illustrating the virtual lines and the movement of the vehicle when the vehicle control system according to the embodiment of the present disclosure performs the automatic stop processing.

MODES FOR CARRYING OUT THE DISCLOSURE

A vehicle control system according to an embodiment of the present disclosure will be described with reference to the attached drawings.

<Structure of the System>

Figure 1:
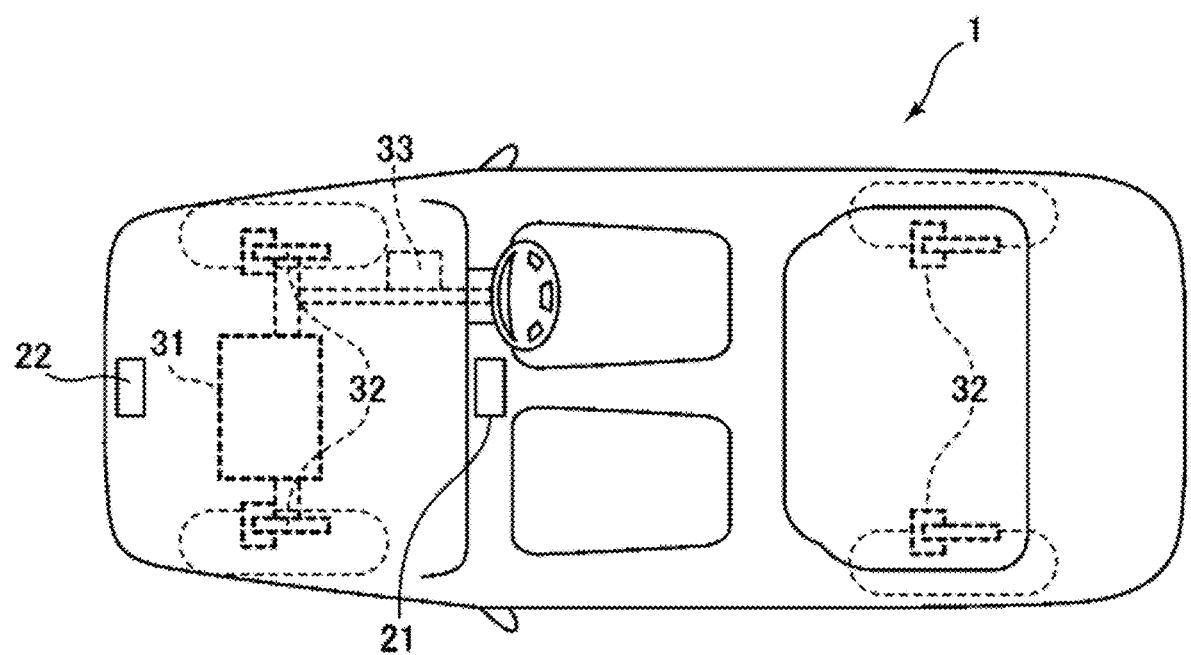
FIG. 1 is a schematic structural diagram of a vehicle to which a vehicle control system according to an embodiment of the present disclosure has been applied.
Figure 2:
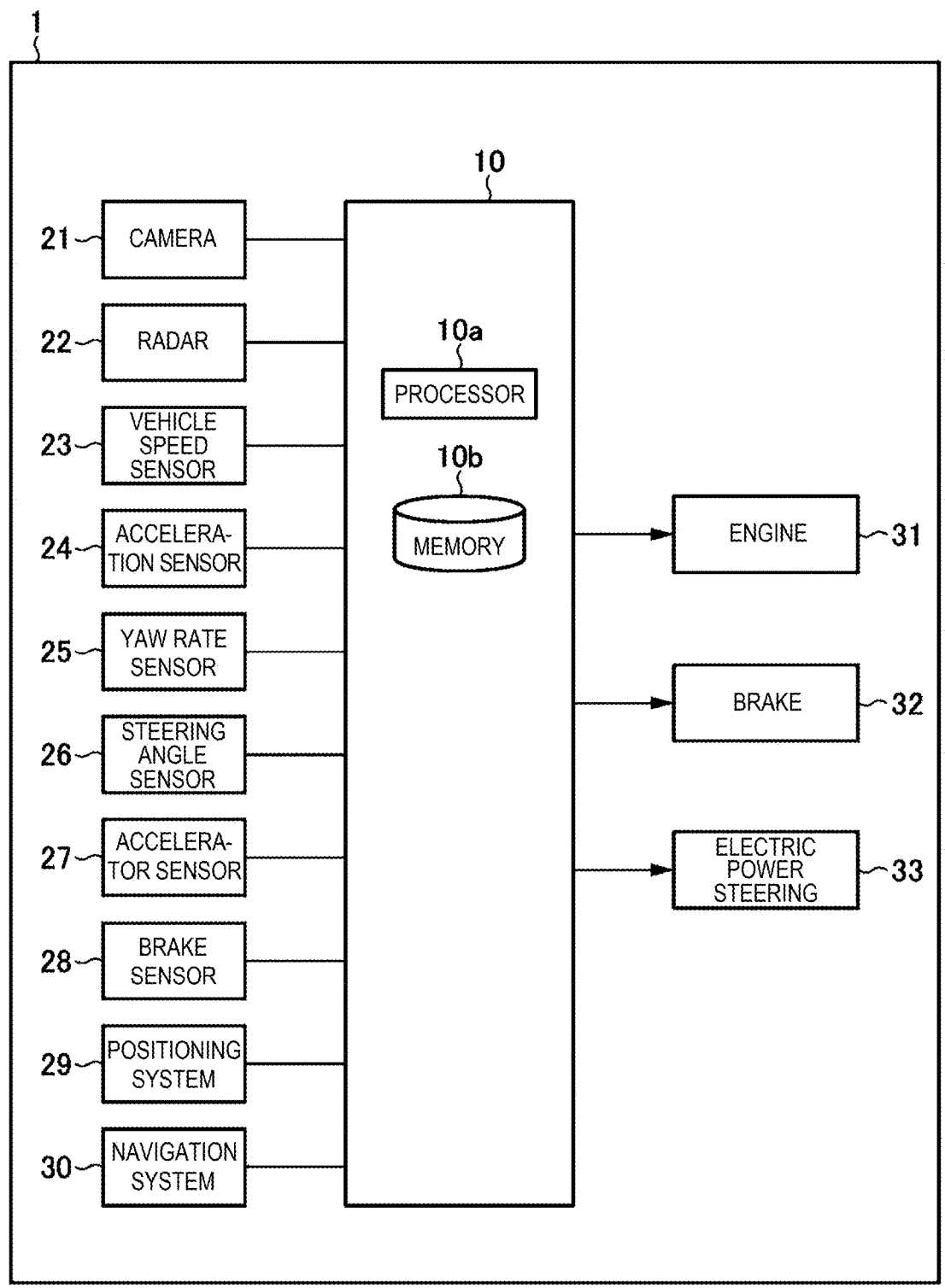
FIG. 2 is a block diagram illustrating the electric structure of the vehicle control system according to the embodiment of the present disclosure.

First, the overall structure of a vehicle to which the vehicle control system according to the embodiment of the present disclosure has been applied will be described with reference to FIGS. 1 and 2. FIG. 1 is a schematic structural diagram of the vehicle to which the vehicle control system according to the embodiment of the present disclosure has been applied. FIG. 2 is a block diagram illustrating the electric structure of the vehicle control system according to the embodiment of the present disclosure.

As illustrated in FIG. 1, reference numeral 1 represents the vehicle to which the vehicle control system according to the embodiment has been applied. This vehicle 1 includes an engine 31 that generates a driving force, brakes 32 that brake the vehicle 1, and an electric power steering 33. The vehicle 1 further includes a camera 21 that takes an image ahead of the vehicle 1 and a radar 22 that detects obstacles around the vehicle 1.

In addition, as illustrated in FIG. 2, the vehicle 1 further includes a vehicle speed sensor 23 that detects the vehicle speed, an acceleration sensor 24 that detects the acceleration in the travel direction of the vehicle 1, a yaw rate sensor 25 that detects the yaw rate of the vehicle 1, a steering angle sensor 26 that detects the steering angle of the vehicle 1, an accelerator sensor 27 that detects the operation (for example, accelerator opening) of an accelerator pedal, a brake sensor 28 that detects the operation (for example, the brake pedal depression amount) of a brake pedal, a positioning system 29 that detects the position of the vehicle 1, and a navigation system 30. The image data taken by the camera 21, the positional information of the obstacle detected by the radar 22, the positional information obtained by the positioning system 29, the information about the position of an emergency parking zone and the like obtained from the navigation system 30, and the detection data detected by individual sensors are output to a controller 10.

The camera 21 takes an image around the vehicle 1 and outputs image data. Based on the image data received from the camera 21, the controller 10 identifies target objects (such as, for example, the partitioning lines of a road (e.g., white and yellow lines including, for example, lane boundary lines, a roadway outer line, a vehicle lane outermost line), road edges (boundaries between roads and other objects such as, for example, a boundary between a paved road and soil, a guardrail, and a curb), and other vehicles, pedestrians, traffic lights, signs, stop lines, intersections, obstacles).

The radar 22 measures the positions and the speeds of target objects (particularly, road edges (boundaries between a road and other objects, such as, for example, the boundary between a paved road and soil, a guardrail, a curb), other vehicles, pedestrians, obstacles, and the like). For example, a millimeter wave radar can be used as the radar 22. The radar 22 transmits radio waves to the surroundings of the vehicle 1 and receives the reflected waves generated by the target object reflecting the transmitted waves. Then, the radar 22 measures the direction and the distance from the vehicle 1 to the target object and the relative speed between the vehicle 1 and the target object based on the transmitted waves and the received waves. The distance and the relative speed with respect to the target object may be measured using a laser radar, an ultrasonic sensor, or the like instead of the radar 22 described above.

As illustrated in FIG. 2, the controller 10 receives the image data taken by the camera 21, the positional information of the obstacle detected by the radar 22, the positional information obtained by the positioning system 29, information about the position of an emergency parking zone and the like obtained from the navigation system 30, and the detection data detected by the individual sensors 23 to 28.

The controller 10 has a computer including one or more processors 10*a* (typically, CPUs), various programs (including a basic control program such as an OS and application programs that are started up by the OS to realize specific functions) that are interpreted and executed by the processors, memories 10*b* such as a ROM in which programs and various types of data are stored and a RAM. A further explaining of the computer is provided in reference to FIG. 8.

Specifically, the controller 10 outputs control signals to mainly the engine 31, the brakes 32, and the electric power steering 33 to control these components based on the image data taken by the camera 21, the positional information of obstacles detected by the radar 22, the positional information obtained by the positioning system 29, information about the position of an emergency parking zone and the like obtained from the navigation system 30, and the detection data detected by the individual sensors 23 to 28. For example, the controller 10 controls the spark plug, the fuel injection valve, the throttle valve, and the like of the engine 31 to adjust the ignition timing, the fuel injection timing, and the fuel injection amount of the engine 31. In addition, the controller 10 controls, for example, the hydraulic pump and the valve unit, and the like of the brakes 32 to cause the brakes 32 to generate a braking force. In addition, the controller 10 controls the motor of the electric power steering 33 and the like to change the travel direction of the vehicle 1.

<Control of the Vehicle>

Next, the automatic stop processing of the vehicle 1 performed by the vehicle control system will be described with reference to FIGS. 3 to 7.

Figure 3:
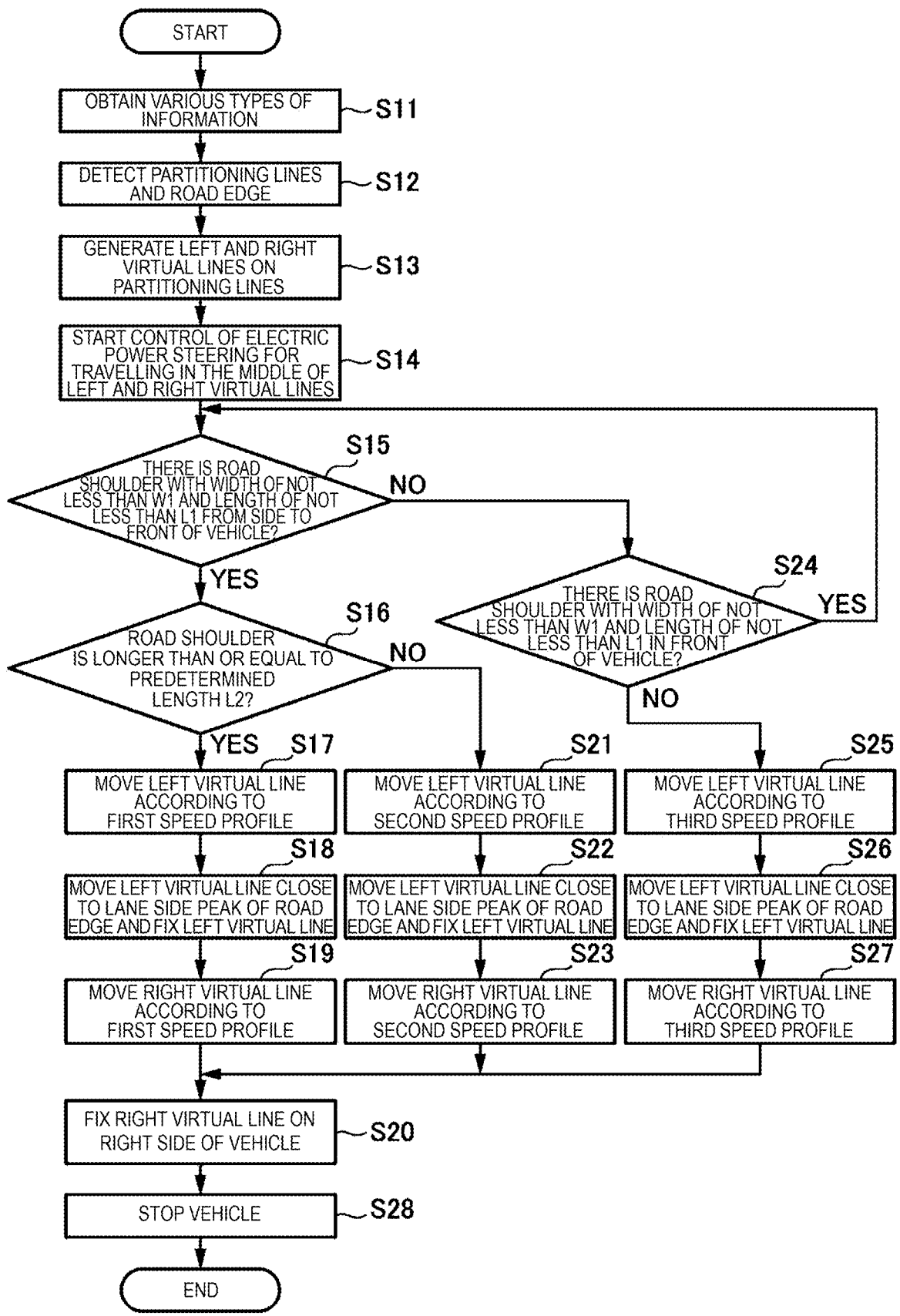
FIG. 3 is a flowchart of automatic stop processing performed by the vehicle control system according to the embodiment of the present disclosure.

FIG. 3 is a flowchart of the automatic stop processing performed by the vehicle control system according to the embodiment of the present disclosure. FIGS. 4 to 6 are plan views illustrating the virtual lines and the movement of the vehicle when the vehicle control system according to the embodiment of the present disclosure performs the automatic stop processing. FIG. 7 is a time chart illustrating changes in the lateral movement speed of the virtual lines when the vehicle control system according to the embodiment of the present disclosure performs the automatic stop processing. While the explanation in FIG. 3, as well as in this disclosure generally, describes a "left lane" driving rule, it should be recognized that the present disclosure may apply equally well, in light of the present teachings, to a country, such as the USA, which uses a "right lane" driving rule. Accordingly, it should be understood that the present disclosure refers to road shoulders being on the left side (as well as lane and road markers), the present disclosure may also be applied to driving scenarios where the road shoulder for a traveling lane is on the right-hand side.

The automatic stop processing in FIG. 3 causes the vehicle 1 to move to the road edge from the traveling lane and stop when the vehicle 1 is traveling in the lane adjacent to the road edge at a predetermined vehicle speed (for example, 20 km/h) or less. For example, when the emergency button of the vehicle 1 is pressed or the driver monitoring system detects an abnormality of the driver while the vehicle 1 travels in the overtaking lane of a highway, the controller 10 causes the vehicle 1 to move to the lane adjacent to the road edge via known automatic driving control and decreases the speed to a predetermined speed while traveling in the lane. After that, the automatic stop processing in FIG. 3 is started up and performed by the controller 10.

As illustrated in FIG. 3, when the automatic stop processing is started, in step S11, the controller 10 obtains various types of information about the vehicle 1, including the image data taken by the camera 21 described above, the positional information of the obstacles detected by the radar 22, and the positional information obtained by the positioning system 29, the information about the position of an emergency parking zone and the like obtained from the navigation system 30, and the information corresponding to the detection data detected by the individual sensors 23 to 28.

Next, in step S12, the controller 10 detects the partitioning lines and the road edge of the road in which the vehicle 1 is traveling, based on the image data input from the camera 21 in step S11. In the examples illustrated in FIGS. 4 to 6, the controller 10 detects a road edge E, a partitioning line (roadway outer line) OL, and partitioning lines BL.

Figure 5A:
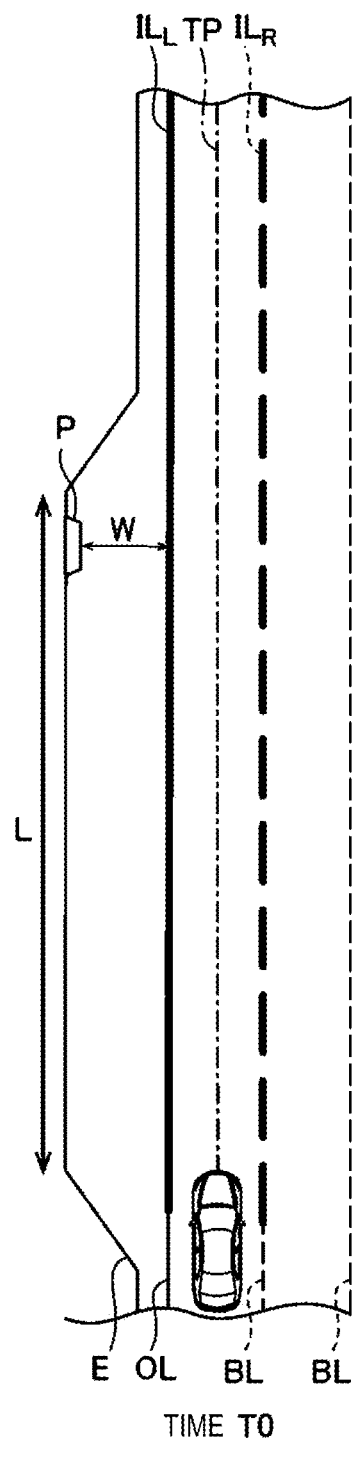
FIGS. 5A, 5B, and 5C are a plan view illustrating the virtual lines and the movement of the vehicle when the vehicle control system according to the embodiment of the present disclosure performs the automatic stop processing.
Figure 6A:
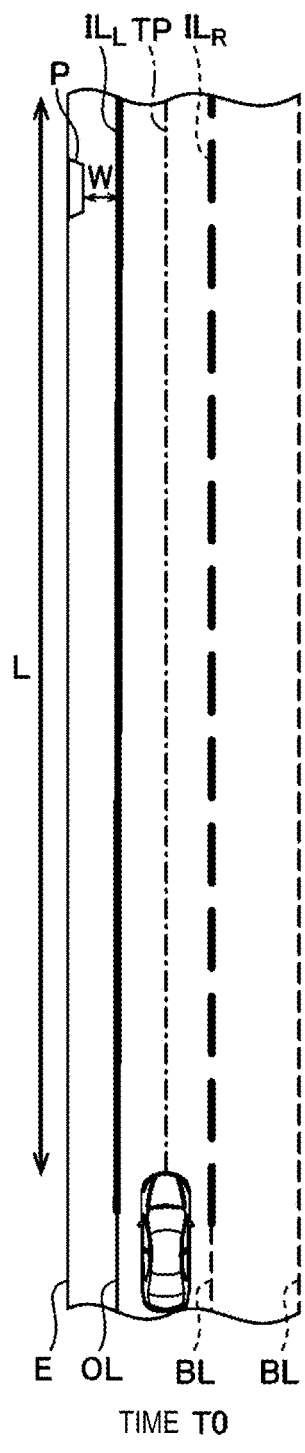
FIGS. 6A, 6B, and 6C are a plan view illustrating the virtual lines and the movement of the vehicle when the vehicle control system according to the embodiment of the present disclosure performs the automatic stop processing.

Next, in step S13, the controller 10 generates a pair of left and right virtual lines extending from the side to the front of the vehicle 1 along the partitioning lines detected in step S12. Examples of the pair of left and right virtual lines generated here are illustrated in FIGS. 4A, 5A, and 6A. In the examples in FIGS. 4A, 5A, and 6A, the controller 10 generates a left virtual line $IL_L$ (indicated by a thick solid line) that overlaps the partitioning line OL (roadway outer line) on the left side (that is, the side closer to the road edge E) in the travel direction of the lane in which the vehicle 1 is traveling and generates a right virtual line $IL_R$ (indicated by a dotted line) that overlaps the partitioning line BL (lane boundary line) on the right side (that is, the side farther from the road edge E) in the travel direction of the lane in which the vehicle 1 is traveling.

Next, in step S14, the controller 10 starts the control of the electric power steering 33 so that the vehicle 1 travels in the middle of the pair of left and right virtual lines. In the examples in FIGS. 4A, 5A, and 6A that illustrate the state in which the pair of left and right virtual lines are generated in step S13, the controller 10 sets a target travel path TP (indicated by a dot-dash line) in the middle of the spacing between the left virtual line $IL_L$ and the right virtual line $IL_R$. Then, the controller 10 determines the steering assist torque by the electric power steering 33 so that the vehicle 1 travels along the target travel path TP, and controls the motor of the electric power steering 33 and the like.

Next, in step S15, the controller 10 determines whether there is a road shoulder with a width of not less than W1 and a length of not less than L1 from the side to the front of the vehicle 1 based on the image data input from the camera 21 in step S11. Here, the area sandwiched between the road edge E and the partitioning line OL closest to the road edge E is referred to as the road shoulder. The width of the road shoulder is the distance between the position P at which the road edge E projects most toward the road and the partitioning line OL closest to the road edge E. The width W1 and the length L1 can be determined in consideration of the width of the vehicle 1 and the upper limit of the deceleration, and the like, that occurs before the vehicle automatically stops and are, for example, 3 m and 30 m, respectively.

As a result of the determination in step S15, the controller 10 proceeds to step S16 when there is a road shoulder with a width of not less than W1 and a length of not less than L1 from the side to the front of the vehicle 1 (Yes in step S15), and determines whether the length of the road shoulder is not less than L2. The length L2 can be determined in consideration of the upper limit of the deceleration, and the like, that occurs before the vehicle automatically stops and is, for example, 50 m.

As a result of the determination in step S16, when the length of the road shoulder is not less than L2 (Yes in step S16), the controller 10 proceeds to step S17 and moves the left virtual line $IL_L$ in parallel toward the road edge E according to the first speed profile. Then, in step S18, the controller 10 moves the left virtual line $IL_L$ to a position in proximity to the position P at which the road edge E projects most toward the road and fixes the left virtual line $IL_L$ to this position.

FIGS. 4A, 4B, and 4C illustrate an example in which the width W of the road shoulder is not less than W1 and the length L of the road shoulder is not less than L2. In the example, the left virtual line $IL_L$ that overlaps the partitioning line OL closest to the road edge E as illustrated in FIG. 4A is moved toward the road edge E as illustrated in FIG. 4B, and is fixed to the position in proximity to the position P at which the road edge E projects most toward the road. The "position in proximity to the position P" is the position separated from the position P by a predetermined distance M toward the road in the width direction of the road shoulder. The predetermined distance M can be determined in consideration of, for example, the distance required for a person to pass between the vehicle 1 and the road edge E and is, for example, 0.2 m. As the left virtual line $IL_L$ moves, the target travel path TP set in the middle of the spacing between the left virtual line $IL_L$ and the right virtual line $IL_R$ also moves toward the road edge E. The movement speed of the target travel path TP at this time is half the speed represented by the first speed profile.

FIG. 7 is a time chart illustrating changes (speed profiles) in the lateral movement speeds of the virtual lines. In FIG. 7, the horizontal axis represents the time and the vertical axis represents the lateral movement speeds of the virtual lines. On the horizontal axis, T0 represents the movement start time of the left virtual line $IL_L$. T1, T1', and T1" represent the movement end times of the left virtual line $IL_L$ and the movement start times of the right virtual line $IL_R$. T2, T2' and T2" represent the movement end times of the right virtual line $IL_R$. In FIG. 7, the first speed profile of the left virtual line $IL_L$ is represented by a curve G11. That is, according to the first speed profile G11, the left virtual line $IL_L$ starts moving at time T0 and then moves toward the road edge E while gradually increasing the speed thereof. After that, as the left virtual line $IL_L$ approaches the road edge E, the increase rate of the movement speed decreases, the movement speed reaches the maximum value at time T1, and the left virtual line $IL_L$ reaches the position in proximity to the position P at which the road edge E projects most toward the road and is fixed to this position (the state in FIG. 4B). That is, the movement speed of the left virtual line $IL_L$ becomes 0.

As described above, as the left virtual line $IL_L$ moves, the target travel path TP set in the middle of the spacing between the left virtual line $IL_L$ and the right virtual line $IL_R$ moves at the speed that is half the speed represented by the first speed profile. That is, in FIG. 7, the speed profile of the target travel path TP is represented by a curve G31 that is half the speed represented by the first speed profile G11. That is, the target travel path TP starts moving at time T0 and then moves toward the road edge E while gradually increasing the speed thereof. After that, as the left virtual line $IL_L$ approaches the road edge E, the increase rate of the movement speed decreases and the movement speed reaches the maximum value at time T1.

After step S18, the controller 10 proceeds to step S19 and moves the right virtual line $IL_R$ in parallel toward the road edge E according to the first speed profile. Then, in step S20, the controller 10 fixes the right virtual line $IL_R$ to the position (that is, the position of the side surface of the vehicle 1 opposite to the road edge E) separated from the left virtual line $IL_L$ by the width of the vehicle 1. In the example, as illustrated in FIGS. 4A and 4B, the right virtual line $IL_R$ that overlaps the partitioning line BL adjacent to the side of the vehicle 1 opposite to the road edge E moves toward the road edge E as illustrated in FIG. 4C and is fixed to the position of the right side surface of the vehicle 1. As the right virtual line $IL_R$ moves, the target travel path TP set in the middle of the spacing between the left virtual line $IL_L$ and the right virtual line $IL_R$ also moves toward the road edge E. The movement speed of the target travel path TP at this time is half the speed represented by the first speed profile as in the movement of the left virtual line $IL_L$. Since the position to which the right virtual line $IL_R$ is fixed is the position separated from the left virtual line $IL_L$ by the width of the vehicle 1, the vehicle 1 is fixed to the position between the left virtual line $IL_L$ and the right virtual line $IL_R$ in the vehicle width direction as illustrated in FIG. 4C.

In FIG. 7, the first speed profile of the right virtual line $IL_R$ is represented by a curve G21. That is, according to the first speed profile G21, the right virtual line $IL_R$ starts moving at the same speed as the movement speed at which the left virtual line $IL_L$ reaches the position in proximity to the road edge E at time T1. After that, the right virtual line $IL_R$ moves toward the road edge E while gradually decreasing the speed thereof, has a movement speed of 0 at time T2, reaches the position (that is, the position of the side surface of the vehicle 1 opposite to the road edge E) separated from the left virtual line $IL_L$ by the width of the vehicle 1, and is fixed to this position (the state in FIG. 4C).

As described above, as the right virtual line $IL_R$ moves, the target travel path TP set in the middle of the spacing between the left virtual line $IL_L$ and the right virtual line $IL_R$ moves at the speed that is half the speed represented by the first speed profile. That is, in FIG. 7, the speed profile of the target travel path TP is represented by the curve G31 that is half the speed represented by the first speed profile G21. That is, the target travel path TP moves toward the road edge E while gradually decreasing the speed thereof from time T1. After that, as the right virtual line $IL_R$ approaches the side surface of the vehicle 1 opposite to the road edge E, the reduction rate of the movement speed decreases and the movement speed becomes 0 at time T2. In addition, since the movement speed when the left virtual line $IL_L$ reaches the position in proximity to the road edge E at time T1 is the same as the movement speed when the right virtual line $IL_R$ starts moving at time T1, the movement speed of the target travel path TP is smoothly continuous before and after time T1. That is, since the movement speed in the vehicle width direction of the vehicle 1 is substantially constant before and after the time T1 and does not change discontinuously, it is possible to prevent the occupant from suffering anxiety or discomfort due to an unstable behavior of the vehicle 1.

In addition, in step S16, when the length of the road shoulder is less than L2 (No in step S16), the controller 10 proceeds to step S21 and moves the left virtual line $IL_L$ in parallel toward the road edge E according to the second speed profile. Then, in step S22, the controller 10 moves the left virtual line $IL_L$ to the position in proximity to the position P at which the road edge E projects most toward the road and fixes the left virtual line $IL_L$ to this position.

Figure 5B:
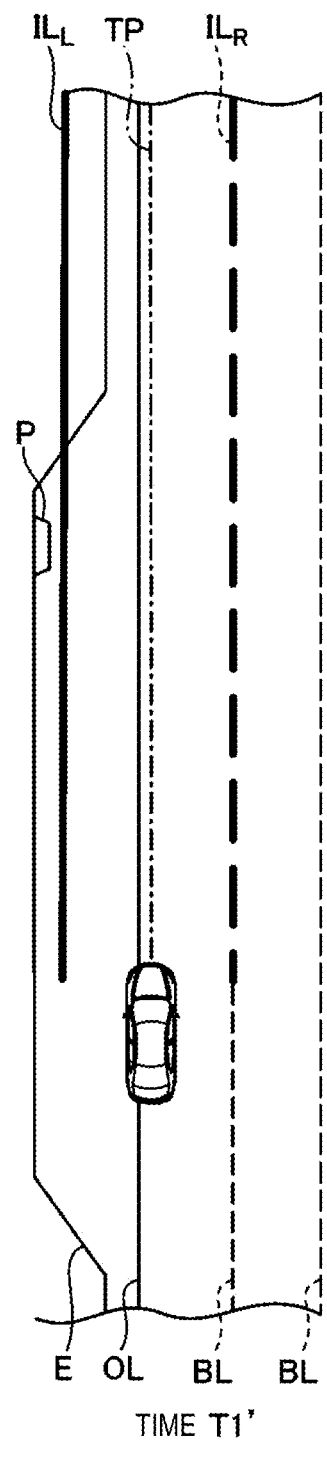
Figure 5C:
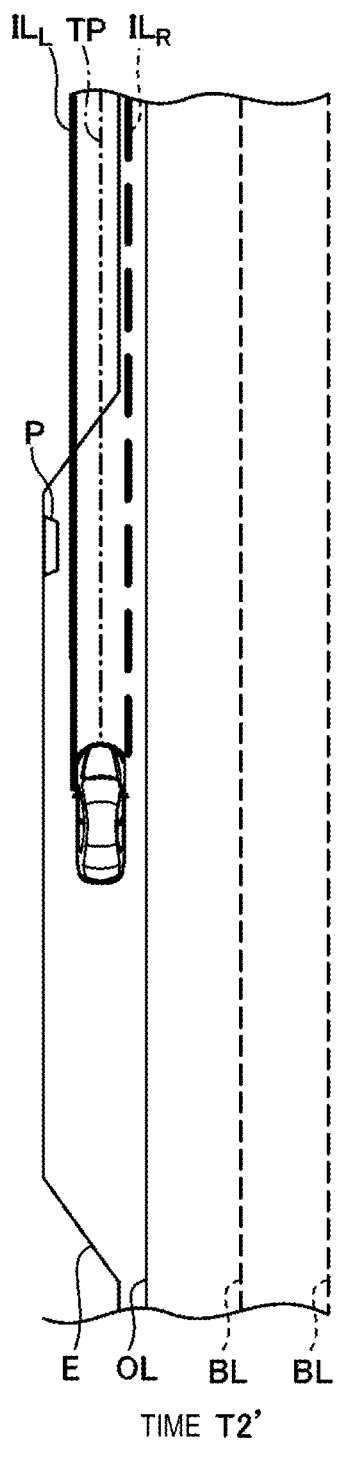

FIGS. 5A, 5B, and 5C illustrate an example in which the width W of the road shoulder is not less than W1 and the length L of the road shoulder is not less than L1 and less than L2. In the example, the left virtual line $IL_L$ that overlaps the partitioning line OL closest to the road edge E as illustrated in FIG. 5A is moved toward the road edge E as illustrated in FIG. 5B and is fixed to the position in proximity to the position P at which the road edge E projects most toward the road. As the left virtual line $IL_L$ moves, the target travel path TP set in the middle of the spacing between the left virtual line $IL_L$ and the right virtual line $IL_R$ also moves toward the road edge E. The movement speed of the target travel path TP at this time is half the speed represented by the second speed profile.

In FIG. 7, the second speed profile of the left virtual line $IL_L$ is represented by a curve G12. That is, according to the second speed profile G12, the left virtual line $IL_L$ starts moving at time T0 and then moves toward the road edge E while gradually increasing the speed thereof. After that, as the left virtual line $IL_L$ approaches the road edge E, the increase rate of the movement speed decreases, the movement speed reaches the maximum value at time T1', and the left virtual line $IL_L$ reaches the position in proximity to the position P at which the road edge E projects most toward the road and is fixed to this position (the state in FIG. 5B). That is, the movement speed of the left virtual line $IL_L$ becomes 0. The second speed profile G12 of this left virtual line $IL_L$ is set to be higher than the first speed profile G11.

As described above, as the left virtual line $IL_L$ moves, the target travel path TP set in the middle of the spacing between the left virtual line $IL_L$ and the right virtual line $IL_R$ moves at the speed that is half the speed represented by the second speed profile. That is, in FIG. 7, the speed profile of the target travel path TP is represented by a curve G32 that is half the speed represented by the second speed profile G12. That is, the target travel path TP starts moving at time T0 and then moves toward the road edge E while gradually increasing the speed thereof. After that, as the left virtual line $IL_L$ approaches the road edge E, the increase rate of the movement speed decreases and the movement speed reaches the maximum value at time T1'.

After step S22, the controller 10 proceeds to step S23 and moves the right virtual line $IL_R$ in parallel toward the road edge E side according to the second speed profile. Then, in step S20, the controller 10 fixes the right virtual line $IL_R$ to the position separated from the left virtual line $IL_L$ by the width of the vehicle 1 (that is, the position of the side surface of the vehicle 1 opposite to the road edge E). In the example, as illustrated in FIGS. 5A and 5B, the right virtual line $IL_R$ that overlaps the partitioning line BL adjacent to the side of the vehicle 1 opposite to the road edge E moves toward the road edge E as illustrated in FIG. 5C and is fixed to the position of the right side surface of the vehicle 1. As the right virtual line $IL_R$ moves, the target travel path TP set in the middle of the spacing between the left virtual line $IL_L$ and the right virtual line $IL_R$ also moves toward the road edge E. The movement speed of the target travel path TP at this time is half the speed represented by the second speed profile as in the movement of the left virtual line $IL_L$. Since the position to which the right virtual line $IL_R$ is fixed is the position separated from the left virtual line $IL_L$ by the width of the vehicle 1, the vehicle 1 is fixed to the position between the left virtual line $IL_L$ and the right virtual line $IL_R$ in the vehicle width direction as illustrated in FIG. 5C.

In FIG. 7, the second speed profile of the right virtual line $IL_R$ is represented by a curve G22. That is, according to the second speed profile G22, the right virtual line $IL_R$ starts moving at the same speed as the movement speed when the left virtual line $IL_L$ reaches the position in proximity to the road edge E at time T1'. After that, the right virtual line $IL_R$ moves toward the road edge E while gradually decreasing the speed thereof, has a movement speed of 0 at time T2', reaches the position (that is, the position of the side surface of the vehicle 1 opposite to the road edge E) separated from the left virtual line $IL_L$ by the width of the vehicle 1, and is fixed to this position (the state in FIG. 5C). The second speed profile G22 of this right virtual line $IL_R$ is set to be higher than the first speed profile G21.

As described above, as the right virtual line $IL_R$ moves, the target travel path TP set in the middle of the spacing between the left virtual line $IL_L$ and the right virtual line $IL_R$ moves at the speed that is half the speed represented by the second speed profile. That is, in FIG. 7, the speed profile of the target travel path TP is represented by the curve G32 that is half the speed represented by the second speed profile G22. That is, the target travel path TP moves toward the road edge E while gradually decreasing the speed thereof from time T1'. After that, as the right virtual line $IL_R$ approaches the side surface of the vehicle 1 opposite to the road edge E, the reduction rate of the movement speed decreases and the movement speed becomes 0 at time T2'. As described above, the second speed profile G12 of the left virtual line $IL_L$ is set to be higher than the first speed profile G11 and the second speed profile G22 of the right virtual line $IL_R$ is set to be higher than the first speed profile G21. Accordingly, the speed profile G32 of the target travel path TP has a speed higher than the speed profile G31 of the target travel path TP corresponding to the first speed profile. With this, the vehicle 1 can be moved to the road edge E in a shorter time and the vehicle 1 can be moved reliably to the road edge E within the length of the road shoulder that is less than L2. In addition, since the movement speed when the left virtual line $IL_L$ reaches the position in proximity to the road edge E at time T1' is the same as the movement speed when the right virtual line $IL_R$ starts moving at time T1', the movement speed of the target travel path TP is smoothly continuous before and after time T1'. That is, since the movement speed in the vehicle width direction of the vehicle 1 is substantially constant before and after the time T1' and does not change discontinuously, it is possible to prevent the occupant from suffering anxiety or discomfort due to an unstable behavior of the vehicle 1.

In addition, in step S15, when there is not a road shoulder with a width of not less than W1 and a length of not less than L1 from the side to the front of the vehicle 1 (No in step S15), the controller 10 proceeds to step S24 and determines whether there is a road shoulder with a width of not less than W1 and a length of not less than L1 in front of the vehicle 1 based on the image data input from the camera 21 in step S11. When, for example, it is detected that no road shoulder is present on the side of the vehicle 1, but a road shoulder with a width of not less than W1 and a length of not less than L1 is present in front of (for example, 50 m ahead) the vehicle 1, the controller 10 determines that a road shoulder with a width of not less than W1 and a length of not less than L1 is present in front of the vehicle 1.

As a result of the determination in step S24, when there is a road shoulder with a width of not less than W1 and a length of not less than L1 in front of the vehicle 1 (Yes in step S24), the controller 10 returns to step S15 and repeats step S15 and step S24 until it is determined that there is a road shoulder with a width of not less than W1 and a length of not less than L1 from the side to the front of the vehicle 1.

In contrast, as a result of the determination in step S24, when there is not a road shoulder with a width of not less than W1 and a length of not less than L1 in front of the vehicle 1 (No in step S24), the controller 10 proceeds to step S25 and moves the left virtual line $IL_L$ in parallel toward the road edge E according to the third speed profile. Then, in step S26, the controller 10 moves the left virtual line $IL_L$ to the position in proximity to the position P at which the road edge E projects most toward the road and fixes the left virtual line $IL_L$ to this position.

Figure 6B:
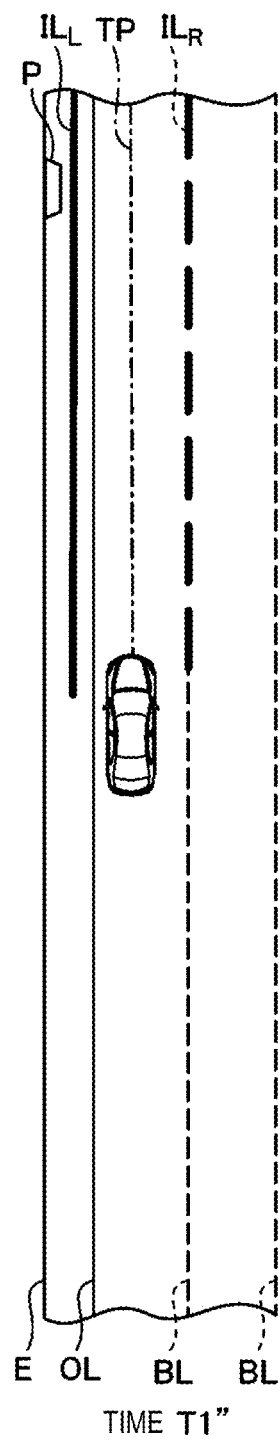
Figure 6C:
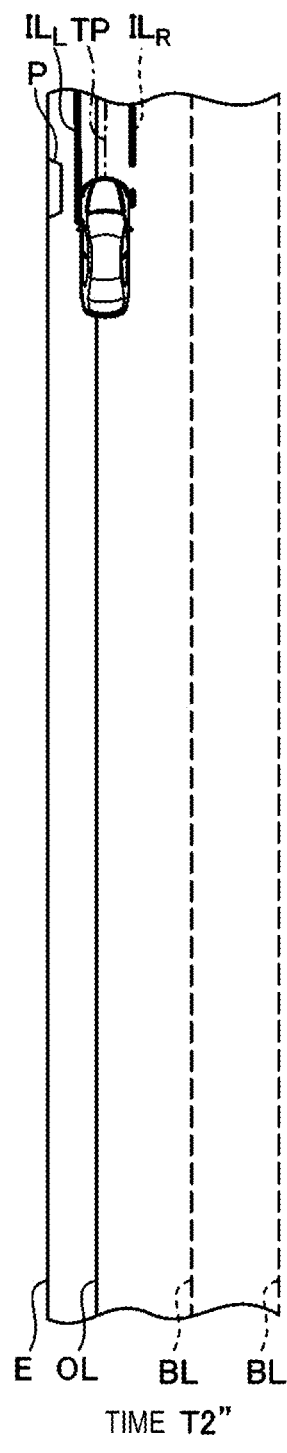
Figure 7:
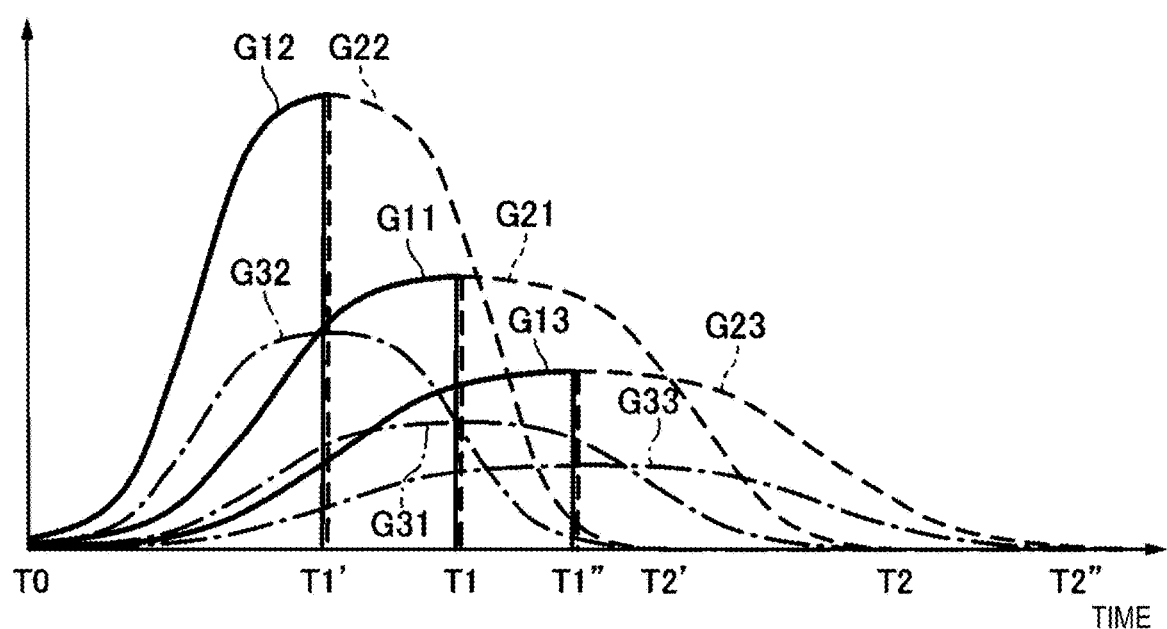
FIG. 7 is a time chart illustrating changes in the lateral movement speeds of the virtual lines when the vehicle control system according to the embodiment of the present disclosure performs the automatic stop processing.

FIGS. 6A, 6B, and 6C illustrate an example in which the width W of the road shoulder is less than W1. In the example, the left virtual line $IL_L$ that overlaps the partitioning line OL closest to the road edge E as illustrated in FIG. 6A is moved toward the road edge E as illustrated in FIG. 6B and is fixed to the position in proximity to the position P at which the road edge E projects most toward the road. As the left virtual line $IL_L$ moves, the target travel path TP set in the middle of the spacing between the left virtual line $IL_L$ and the right virtual line $IL_R$ also moves toward the road edge E. The movement speed of the target travel path TP at this time is half the speed represented by the third speed profile.

In FIG. 7, the third speed profile of the left virtual line $IL_L$ is represented by a curve G13. That is, according to the third speed profile G13, the left virtual line $IL_L$ starts moving at time T0 and then moves toward the road edge E while gradually increasing the speed thereof. After that, as the left virtual line $IL_L$ approaches the road edge E, the increase rate of the movement speed decreases, the movement speed reaches the maximum value at time T1', and the left virtual line $IL_L$ reaches the position in proximity to the position P at which the road edge E projects most toward the road and is fixed to this position (the state in FIG. 6B). That is, the movement speed of the left virtual line $IL_L$ becomes 0. The third speed profile G13 of this left virtual line $IL_L$ is set to be lower than the first speed profile G11.

As described above, as the left virtual line $IL_L$ moves, the target travel path TP set in the middle of the spacing between the left virtual line $IL_L$ and the right virtual line $IL_R$ moves at the speed that is half the speed represented by the third speed profile. That is, in FIG. 7, the speed profile of the target travel path TP is represented by a curve G33 that is half the speed represented by the third speed profile G13. That is, the target travel path TP starts moving at time T0 and then moves toward the road edge E while gradually increasing the speed thereof. After that, as the left virtual line $IL_L$ approaches the road edge E, the increase rate of the movement speed decreases and the movement speed reaches the maximum value at time T1'.

After step S26, the controller 10 proceeds to step S27 and moves the right virtual line $IL_R$ in parallel toward the road edge E according to the third speed profile. Then, in step S20, the controller 10 fixes the right virtual line $IL_R$ to the position (that is, the position of the side surface of the vehicle 1 opposite to the road edge E) separated from the left virtual line $IL_L$ by the width of the vehicle 1. In the example, as illustrated in FIGS. 6A and 6B, the right virtual line $IL_R$ that overlaps the partitioning line BL adjacent to the side of the vehicle 1 opposite to the road edge E is moved toward the road edge E as illustrated in FIG. 6C and fixed to the position of the right side surface of the vehicle 1. As the right virtual line $IL_R$ moves, the target travel path TP set in the middle of the spacing between the left virtual line $IL_L$ and the right virtual line $IL_R$ also moves toward the road edge E. The movement speed of the target travel path TP at this time is half the speed represented by the third speed profile as in the movement of the left virtual line $IL_L$. Since the position to which the right virtual line $IL_R$ is fixed is separated from the left virtual line $IL_L$ by the width of the vehicle 1, the vehicle 1 is fixed to the position between the left virtual line $IL_L$ and the right virtual line $IL_R$ in the vehicle width direction as illustrated in FIG. 6C.

In FIG. 7, the third speed profile of the right virtual line $IL_R$ is represented by a curve G23. That is, according to the third speed profile G23, the right virtual line $IL_R$ starts moving at the same speed as the movement speed when the left virtual line $IL_L$ reaches the position in proximity to the road edge E at time T1". After that, the right virtual line $IL_R$ moves toward the road edge E while gradually decreasing the speed thereof, has a movement speed of 0 at time T2", reaches the position (that is, the position of the side surface of the vehicle 1 opposite to the road edge E) separated from the left virtual line $IL_L$ by the width of the vehicle 1, and is fixed to this position (the state in FIG. 6C). The third speed profile G23 of this right virtual line $IL_R$ is set to be lower than the first speed profile G21.

As described above, as the right virtual line $IL_R$ moves, the target travel path TP set in the middle of the spacing between the left virtual line $IL_L$ and the right virtual line $IL_R$ moves at the speed that is half the speed represented by the third speed profile. That is, in FIG. 7, the speed profile of the target travel path TP is represented by the curve G33 that is half the speed represented by the third speed profile G23. That is, the target travel path TP moves toward the road edge E while gradually decreasing the speed thereof from time T1". After that, as the right virtual line $IL_R$ approaches the side surface of the vehicle 1 opposite to the road edge E, the reduction rate of the movement speed decreases and the movement speed becomes 0 at time T2". As described above, the third speed profile G13 of the left virtual line $IL_L$ is set to be lower than the first speed profile G11 and the third speed profile G23 of the right virtual line $IL_R$ is set to be lower than the first speed profile G21. Accordingly, the speed profile G33 of the target travel path TP has a speed lower than the speed profile G31 of the target travel path TP corresponding to the first speed profile. With this, the vehicle 1 can be moved to the road edge E in a longer period of time, and the vehicle 1 can gradually enter the narrow road shoulder. In addition, since the movement speed when the left virtual line $IL_L$ reaches the position in proximity to the road edge E at time T1″ is the same as the movement speed when the right virtual line $IL_R$ starts moving at time T1′, the movement speed of the target travel path TP is smoothly continuous before and after time T1″. That is, since the movement speed in the vehicle width direction of the vehicle 1 is substantially constant before and after the time T1′ and does not change discontinuously, it is possible to prevent the occupant from suffering anxiety or discomfort due to an unstable behavior of the vehicle 1.

After step S20, the controller 10 proceeds to step S28 and stops the vehicle 1. For example, the controller 10 controls the engine 31 and the brakes 32 so as to generate a predetermined deceleration (for example, a deceleration of not more than 0.2 G) until the vehicle speed becomes 0. After the vehicle 1 stops, the controller 10 finishes the automatic stop processing.

<Modifications>

Next, further modifications of the embodiment of the present disclosure will be described.

In the embodiment described above, a case is exemplified, in which the vehicle 1 having the vehicle control system includes the engine 31 as the power source for generating a driving force, but the vehicle 1 may include a battery and a motor as the power source instead of the engine 31 or together with the engine 31.

<Operation and Advantageous Effects>

Next, the operation and advantageous effects of the vehicle control systems according to the embodiments of the present disclosure and the modifications of the embodiments of the present disclosure will be described.

The controller 10 detects the partitioning lines OL and BL of a road and the road edge E from the image taken by the camera 21, generates the pair of left and right virtual lines $IL_L$ and $IL_R$ that extend from the side to the front of the vehicle 1 along the partitioning lines OL and BL, controls the electric power steering 33 so that the vehicle 1 travels in the middle of the pair of left and right virtual lines $IL_L$ and $IL_R$, moves the left virtual line $IL_L$ closer to the road edge E of the pair of left and right virtual lines $IL_L$ and $IL_R$ to the position in proximity to the road edge E and fixes the left virtual line $IL_L$ to the position, and then, moves the right virtual line $IL_R$ father from the road edge E of the pair of left and right virtual lines $IL_L$ and $IL_R$ to the position separated from the left virtual line $IL_L$ by the width of the vehicle 1 and fixes the right virtual line $IL_R$ to the position, and controls the brakes 32 so as to stop the vehicle 1 after fixing the pair of left and right virtual lines $IL_L$ and $IL_R$. That is, the controller 10 first fixes the left virtual line $IL_L$ to the position in proximity to the road edge E while controlling the electric power steering 33 so that the vehicle 1 travels in the middle of the left and right virtual lines $IL_L$ and $IL_R$, and then moves the right virtual line $IL_R$ toward the road edge E. With this, even when a structure such as a guardrail, a wall, a utility pole, or a curb projects toward the roadway from the road edge E, the vehicle 1 can be gradually moved to the road edge E without being disturbed by variations in the distance between the road edge E and the vehicle 1, thereby preventing the behavior of the vehicle 1 from becoming unstable. Accordingly, when the driver falls in an incapacitated state, the behavior of the vehicle 1 until the vehicle 1 moves to the road edge E and stops can be stabilized, thereby suppressing an increase in the anxiety and discomfort of the driver and other occupants.

In addition, the controller 10 makes the movement speed when the left virtual line $IL_L$ closer to the road edge E reaches the position in proximity to the road edge E identical to the movement speed when the right virtual line $IL_R$ farther from the road edge E starts moving. That is, when the left virtual line $IL_L$ reaches the position in proximity to the road edge E and the right virtual line $IL_R$ starts moving, the movement speed in the vehicle width direction of the vehicle 1 that travels in the middle of the left and right virtual lines $IL_L$ and $IL_R$ is smoothly continuous and does not change discontinuously. Accordingly, it is possible to prevent the occupant from suffering anxiety or discomfort due to an unstable behavior of the vehicle 1.

In addition, the controller 10 starts moving the left virtual line $IL_L$ closer to the road edge E, gradually increases the movement speed of the left virtual line $IL_L$, starts moving the right virtual line $IL_R$ farther from the road edge E, and gradually decreases the movement speed of the right virtual line $IL_R$. That is, the controller 10 can gradually increase the movement speed in the vehicle width direction of the vehicle 1 that travels in the middle of the left and right virtual lines $IL_L$ and $IL_R$ according to the movement of the left virtual line $IL_L$ and then decrease the movement speed according to the movement of the right virtual line $IL_R$. With this, the vehicle 1 can be smoothly moved to the road edge E.

In addition, the controller 10 moves the left virtual line $IL_L$ closer to the road edge E to the position in proximity to the position P at which the road edge E projects most toward the road and fixes the left virtual line $IL_L$ to this position. With this, even when a structure such as a guardrail, a wall, a utility pole, or a curb projects toward the roadway from the road edge E, the vehicle 1 can be gradually moved to the road edge E so as to correspond to the position P at which the road edge E projects most toward the road, thereby preventing the behavior of the vehicle 1 from becoming unstable.

In addition, when the width of the road shoulder sandwiched between the road edge E and the partitioning line OL closest to the road edge E is less than the predetermined width W1, the controller 10 makes the movement speed of the pair of left and right virtual lines $IL_L$ and $IL_R$ lower than when the width of the road shoulder is not less than the predetermined width W1. Accordingly, the movement speed in the vehicle width direction of the vehicle 1 that travels in the middle of the left and right virtual lines $IL_L$ and $IL_R$ is lower than when the width of the road shoulder is not less than the predetermined width W1. That is, when the width of the road shoulder is narrow, the vehicle 1 can be moved to the road edge E for a longer period of time so as to prevent the occupant from suffering anxiety or discomfort.

In addition, when the width of the road shoulder sandwiched between the road edge E and the partitioning line OL closest to the road edge E is not less than the predetermined width W1 and the length of the road shoulder is less than the predetermined length L2, the controller 10 makes the movement speeds of the pair of left and right virtual lines $IL_L$ and $IL_R$ higher than when the width of the road shoulder is not less than the predetermined width W1 and the length of the road shoulder is not less than the predetermined length L2. Accordingly, the movement speed in the vehicle width direction of the vehicle 1 that travels in the middle of the left and right virtual lines $IL_L$ and $IL_R$ is also higher than when the width of the road shoulder is not less than the predetermined width W1 and the length of the road shoulder is not less than the predetermined length L2. That is, the vehicle 1 can be moved to the road edge E in a shorter period of time and the vehicle 1 can be reliably moved to the road edge E within the length of the road shoulder that is less than L2.

Figure 8:
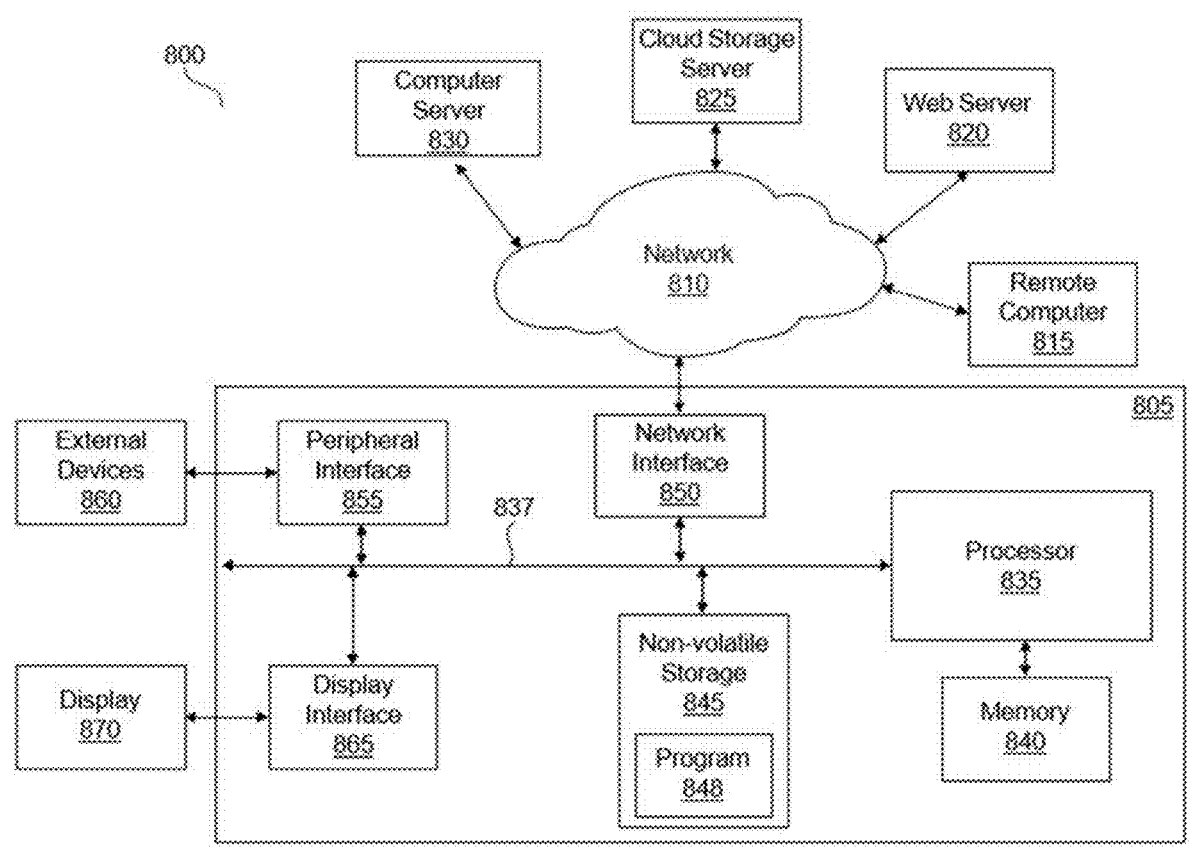
FIG. 8 is a diagram of a computer-based controller that is programmable to carry out the computer-based operations described herein.

FIG. 8 illustrates a block diagram of a computer that may implement the various embodiments described herein.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 8 is a functional block diagram illustrating a networked system 800 of one or more networked computers and servers. In an embodiment, the hardware and software environment illustrated in FIG. may provide an exemplary platform for implementation of the software and/or methods according to the present disclosure.

Referring to FIG. 8, a networked system 800 may include, but is not limited to, computer 805, network 810, remote computer 815, web server 820, cloud storage server 825 and computer server 830. In some embodiments, multiple instances of one or more of the functional blocks illustrated in FIG. 8 may be employed.

Additional detail of computer 805 is shown in FIG. 8. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, notebook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

DESCRIPTION OF REFERENCE SIGNS AND NUMERALS

1: vehicle
10: controller
10a: processor
10b: memory
21: camera
22: radar
23: vehicle speed sensor
24: acceleration sensor
25: yaw rate sensor
26: steering angle sensor
27: accelerator sensor
28: brake sensor
29: positioning system
30: navigation system
31: engine
32: brake
33: electric power steering
E: road edge
$IL_L$: left virtual line
$IL_R$: right virtual line
OL: partitioning line
BL: partitioning line
TP: target travel path

The invention claimed is:

1. A vehicle control system that causes a vehicle to move to a road edge and stop, the vehicle control system comprising:
   a control circuit configured to control a steering device and a braking device of the vehicle to cause the vehicle to move to the road edge and stop based on an analysis performed by the control circuit on an image ahead of the vehicle taken by a camera,
   wherein the control circuit is configured to
      detect a partitioning line of a road and the road edge based on the image taken by the camera,
      set a pair of left and right virtual lines extending from respective sides of the vehicle to the road in front of the vehicle along the partitioning line, control the steering device so that the vehicle travels substantially in the middle of the pair of left and right virtual lines,
move a first virtual line that is closer to the road edge of the pair of left and right virtual lines to a first position at a predetermined distance to the road edge, and fix the first virtual line closer to the road edge to the position at the predetermined distance to the road edge,
move a second virtual line that is farther from the road edge of the pair of left and right virtual lines to a second position separated from the first virtual line by a width of the vehicle, and fix the second virtual line farther to the position separated from the first virtual line,
control a movement speed of the first virtual line when the virtual line reaches the predetermined distance to the road edge to be identical to a movement speed of the second virtual line under a condition the control circuit starts movement of the second virtual line,
control the steering device so that the vehicle travels substantially in the middle of the first virtual line and the second virtual line, and
control the braking device so that the vehicle stops after the vehicle is in the middle of the pair of left and right virtual lines.

2. The vehicle control system according to claim 1, wherein the control circuit is configured to gradually increase the movement speed of the first virtual line closer to the road edge after starting movement of the first virtual line and gradually decrease the movement speed of the second virtual line after starting movement of the second virtual line.

3. The vehicle control system according to claim 2, wherein the control circuit is configured to move the virtual line closer to the road edge to a position at the predetermined distance which the road edge projects most toward the road and fixes the virtual line to the position.

4. The vehicle control system according to claim 3, wherein the control circuit is configured to control the movement speed of the virtual line, under a condition a width of a road shoulder sandwiched between the road edge and the partitioning line closest to the road edge is less than a predetermined width, lower than the movement speed of each virtual line when the width of the road shoulder is not less than the predetermined width.

5. The vehicle control system according to claim 4, wherein, under a condition the width of the road shoulder sandwiched between the road edge and the partitioning line closest to the road edge is not less than the predetermined width and a length of the road shoulder is less than a predetermined length, the control circuit is configured to control the movement speed of each virtual line higher than when the width of the road shoulder is not less than the predetermined width and the length of the road shoulder is not less than the predetermined length.

6. The vehicle control system according to claim 1, wherein the control circuit is configured to move the first virtual line to a position at the predetermined distance at which the road edge projects most toward the road and fixes the first virtual line to the position.

7. The vehicle control system according to claim 1, wherein the control circuit is configured to move the first virtual line to a position at the predetermined distance at which the road edge projects most toward the road and fixes the first virtual line to the position.

8. The vehicle control system according to claim 1, wherein the control circuit is configured to control the movement speed of each virtual line, under a condition a width of a road shoulder sandwiched between the road edge and the partitioning line closest to the road edge is less than a predetermined width, lower than the movement speed of each virtual line when the width of the road shoulder is not less than the predetermined width.

9. The vehicle control system according to claim 1, wherein the control circuit is configured to control the movement speed of each virtual line, under a condition a width of a road shoulder sandwiched between the road edge and the partitioning line closest to the road edge is less than a predetermined width, lower than the movement speed of each virtual line when the width of the road shoulder is not less than the predetermined width.

10. The vehicle control system according to claim 2, wherein the control circuit is configured to control the movement speed of each virtual line, under a condition a width of a road shoulder sandwiched between the road edge and the partitioning line closest to the road edge is less than a predetermined width, lower than the movement speed of each virtual line when the width of the road shoulder is not less than the predetermined width.

11. The vehicle control system according to claim 1, wherein, under a condition the width of the road shoulder sandwiched between the road edge and the partitioning line closest to the road edge is not less than the predetermined width and a length of the road shoulder is less than a predetermined length, the control circuit is configured to control the movement speed of each virtual line higher than when the width of the road shoulder is not less than the predetermined width and the length of the road shoulder is not less than the predetermined length.

12. The vehicle control system according to claim 1, wherein, under a condition the width of the road shoulder sandwiched between the road edge and the partitioning line closest to the road edge is not less than the predetermined width and a length of the road shoulder is less than a predetermined length, the control circuit is configured to control the movement speed of each virtual line higher than when the width of the road shoulder is not less than the predetermined width and the length of the road shoulder is not less than the predetermined length.

13. The vehicle control system according to claim 2, wherein, under a condition the width of the road shoulder sandwiched between the road edge and the partitioning line closest to the road edge is not less than the predetermined width and a length of the road shoulder is less than a predetermined length, the control circuit is configured to control the movement speed of each virtual line higher than when the width of the road shoulder is not less than the predetermined width and the length of the road shoulder is not less than the predetermined length.

14. The vehicle control system according to claim 3, wherein, under a condition the width of the road shoulder sandwiched between the road edge and the partitioning line closest to the road edge is not less than the predetermined width and a length of the road shoulder is less than a predetermined length, the control circuit is configured to control the movement speed of each virtual line higher than when the width of the road shoulder is not less than the predetermined width and the length of the road shoulder is not less than the predetermined length.

15. The vehicle control system according to claim 8, wherein, under a condition the width of the road shoulder sandwiched between the road edge and the partitioning line closest to the road edge is not less than the predetermined width and a length of the road shoulder is less than a predetermined length, the control circuit is configured to control the movement speed of each virtual line higher than when the width of the road shoulder is not less than the predetermined width and the length of the road shoulder is not less than the predetermined length.

16. The vehicle control system according to claim 9, wherein, under a condition the width of the road shoulder sandwiched between the road edge and the partitioning line closest to the road edge is not less than the predetermined width and a length of the road shoulder is less than a predetermined length, the control circuit is configured to control the movement speed of each virtual line higher than when the width of the road shoulder is not less than the predetermined width and the length of the road shoulder is not less than the predetermined length.

17. The vehicle control system according to claim 10, wherein, under a condition the width of the road shoulder sandwiched between the road edge and the partitioning line closest to the road edge is not less than the predetermined width and a length of the road shoulder is less than a predetermined length, the control circuit is configured to control the movement speed of each virtual line higher than when the width of the road shoulder is not less than the predetermined width and the length of the road shoulder is not less than the predetermined length.

18. A non-transitory computer readable storage device having computer readable instructions that when executed by circuitry cause the circuitry to:
control a steering device and a braking device of the vehicle to cause the vehicle to move to the road edge and stop based on an analysis on an image ahead of a vehicle taken by a camera, the analysis including
detect a partitioning line of a road and the road edge based on the image taken by the camera,
set a pair of left and right virtual lines extending from respective sides of the vehicle to the road in front of the vehicle along the partitioning line,
control the steering device so that the vehicle travels substantially in the middle of the pair of left and right virtual lines,
move a first virtual line that is closer to the road edge of the pair of left and right virtual lines to a first position at a predetermined distance to the road edge, and fix the first virtual line closer to the road edge to the position at the predetermined distance to the road edge,
move a second virtual line that is farther from the road edge of the pair of left and right virtual lines to a second position separated from the first virtual line by a width of the vehicle, and fix the second virtual line farther to the position separated from the first virtual line,
control a movement speed of the first virtual line when the virtual line reaches the predetermined distance to the road edge to be identical to a movement speed of the second virtual line under a condition the control circuit starts movement of the second virtual line,
control the steering device so that the vehicle travels substantially in the middle of the first virtual line and the second virtual line, and
control the braking device so that the vehicle stops after the vehicle is in the middle of the pair of left and right virtual lines.

* * * * *